(12) United States Patent
Bischof et al.

(10) Patent No.: US 6,658,573 B1
(45) Date of Patent: Dec. 2, 2003

(54) PROTECTING RESOURCES IN A DISTRIBUTED COMPUTER SYSTEM

(75) Inventors: Joerg Bischof, Urdorf (CH); Thomas Eirich, Au (CH); Dirk Husemann, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/341,739

(22) PCT Filed: Jan. 17, 1997

(86) PCT No.: PCT/IB97/00025
§ 371 (c)(1),
(2), (4) Date: Jul. 15, 1999

(87) PCT Pub. No.: WO98/32073
PCT Pub. Date: Jul. 23, 1998

(51) Int. Cl.$^7$ .......................... G06F 17/00; G06F 15/16

(52) U.S. Cl. .......................... 713/201; 703/200; 707/9; 707/10

(58) Field of Search ................................ 713/200, 201; 707/103 R, 10, 200, 205, 101, 9; 709/220, 203, 229

(56) References Cited

U.S. PATENT DOCUMENTS

| | | | | |
|---|---|---|---|---|
| 5,717,911 A | * | 2/1998 | Madrid et al. | 707/2 |
| 5,745,683 A | * | 4/1998 | Lee et al. | 709/250 |
| 5,765,154 A | * | 6/1998 | Horikiri et al. | 707/10 |
| 5,857,102 A | * | 1/1999 | McChesney et al. | 713/100 |
| 5,944,793 A | * | 8/1999 | Islam et al. | 709/220 |
| 6,145,083 A | * | 11/2000 | Shaffer et al. | 713/201 |
| 6,205,466 B1 | * | 3/2001 | Karp et al. | 709/104 |
| 6,233,576 B1 | * | 5/2001 | Lewis | 707/9 |

FOREIGN PATENT DOCUMENTS

JP  7-78082  3/1995

OTHER PUBLICATIONS

"Fundamentals and Application of OS," published Nov. 30, 1995.
"Distributed System Concept and Design," published Jun. 15, 1991.
"Distributed Operating System—next to UNIX," published Dec. 25, 1991.
"Design of Distributed Operating System," published Jul. 1, 1988.
Pardyak, P., et al., "Dynamic Binding for an Extensible System," Operating System Review (SIGOPS), vol. 30, No. Special Issue, 1996, pp. 201–212.
Geihs, K., et al., "Protected Object References in Heterogeneous Distributed Systems," IEEE Transactions on Computers, vol. 42, No. 7, Jul. 1993, pp. 809–816.

* cited by examiner

Primary Examiner—Ly V. Hua
(74) Attorney, Agent, or Firm—Scull, Scott, Murphy & Presser; Gail H. Zarick, Esq.

(57) ABSTRACT

This invention concerns methods for the protection of resources in an open digital communication system, which resources are residing in or owned by physically and organizationally distributed, independent entities connected through that system, e.g. the Internet. Since, in such an open system, any entity can in principle access any resource of any other entity, precautions must be taken to avoid or minimize the danger of resource corruption and destruction, to maintain privacy and, where necessary, confidentiality. Thus, protection of resources is of ultimate importance to warrant integrity and function of an entity. For the intelligent protection of such resources, in particular against unauthorized access, a variable-grained control of the name space (consisting of all names an entity provides) and/or the provision of attachable and detachable guards accompanying each call for a file and/or service is provided.

13 Claims, 3 Drawing Sheets

PROTECTING RESOURCES IN A DISTRIBUTED COMPUTER SYSTEM

FIELD OF THE INVENTION

In an open digital communication system connecting physically and organisationally distributed, independent entities, this invention is related to methods for the protection of resources residing in or owned by these entities. Since, in such an open system, any entity can in principle access any resource of any other entity, protection of resources is of ultimate importance to warrant integrity and function of an entity. A current example for such a system is the Internet with its distributed processing stations, servers and end-user computers, which provide and own the resources, e.g. data or program files. The present invention concerns the intelligent protection of such resources, in particular against unauthorized access.

BACKGROUND AND PRIOR ART

Resource sharing is a well-known concept in many areas: by sharing a scarce, expensive, or seldom used resource, the burden of maintaining this resource is distributed among a group of users. Hand in hand with the desire to share a resource goes the desire to protect the resource from unauthorized use: Resource sharing usually implies resource protection. Not surprisingly, resource sharing and resource protection are key issues of distributed, networked computers. The more computers become ubiquitous and connected, the more the need arises to have means of protecting resources in these connected systems. This requirement is especially true for open networks like the Internet. In such an open, distributed, networked system, it is unavoidable to protect specific resources from unauthorized access, such as sensitive data like password files and private materials, or hardware resources like file system space and communication capacity, or services like cryptographic services. Protecting here means both the basic access to the resource itself and the use of it by an accessing entity; that is, both coarse-grained resource protection (e.g. an entity is allowed to use file system services) and fine-grained resource protection (e.g. an entity is allowed to use file system services, but cannot access password files).

Current approaches to resource protection in distributed systems rely in most cases on authentication-based schemes that require more or less extensive changes at the service-providing entity. "Kerberos" for example, as described by J. G. Steiner, B. C. Neuman, and J. I. Schiller in "Kerberos: An authentication service for open network systems" in Usenix Conference Proceedings, Usenix, February 1988, requires encrypted tickets to be sent along with each service request. After having authenticated herself/himself with a special and trusted ticket granting service, the user can request Kerberos tickets for any other service he/she is entitled to use and wants to invoke. Though rather safe, this is a burdensome, time-consuming, and traffic-increasing way to achieve the desired goal of resource protection. More specifically, the Kerberos approach to resource protection suffers from the drawbacks both that it is not transparent (in the sense that it is visible) to the service-providing entities and that it is a discretionary mechanism in the sense that the called entity itself has to check explicitly for a valid ticket from the calling entity. The code implementing the entity must contain calls to respective libraries; an entity that "forgets" to check for a valid ticket will provide access to its resource to any caller. Furthermore, once an attacker compromises the central ticket granting service, he/she also has access to all entities that participate in the associated distributed system.

Another solution for the resource protection task was presented by D. B. Clifton in U.S. Pat. No. 5,469,556, entitled "Resource access security system for controlling access to resources of a data processing system", issued November 1995. Clifton introduces special objects, so-called descriptors, for addressing resources such as memory addresses in hardware. Attached to each descriptor is a set of tables that controls access to a particular resource. Essentially, this descriptor forms a virtual address of the resource (cf. column 3, lines 34–37 of the Clifton patent), and as such establishes a fine-grained access control for resources in a system.

Although Clifton's approach to resource protection does not suffer from the central vulnerability as Kerberos does, this immunity also represents one of its disadvantages. Clifton's approach is not applicable to distributed systems as it is tied to the memory address translation mechanism—and thus to a single address space—through the use of its descriptors. A distributed system, however, practically by definition comprises several address spaces connected by some kind of communication medium. In addition, Clifton's solution is also not transparent, the user must use the special descriptors and thus has to code his/her programs accordingly.

Furthermore, both the Kerberos and the Clifton approaches cannot deal with resources that appear dynamically during the runtime of the system (and after the resource protection mechanism has been set up). In an environment where entities can immigrate into a distributed system from the outside (e.g. a Java applet coming in from the Internet) exist dynamically created resources and it is necessary to offer protection for these resources, too.

Thus, it is the main object of the invention to establish a resource protection mechanism that is applicable to dynamic distributed systems. A further object is to create a resource protection mechanism that is transparent to a program and/or entity that wants to access the resources to be protected. A still further object of the invention is to devise a method for resource protection that is dynamically expandable, preferably during runtime, to protect newly created resources.

SUMMARY OF THE INVENTION

Resources to be protected against unauthorized access in a distributed system are usually owned or provided by entities, e.g. servers or other processing stations. Although, in principle, in an open, distributed system, each entity is allowed to access any resource of any other entity, as discussed above, security requires to protect certain resources and to allow access to them only for certain entities and/or under certain conditions.

Resources may be disk space, files, network connections, but also methods offered by objects and objects themselves. Access to such resources in a distributed system occurs through services or methods, provided by entities or objects. The inventive concept starts from the idea to reduce the access to a resource to the access to a service. To invoke or use a service, the names of both the entity owning or providing the service and of the service itself must be known. To actually access a service, a mapping of its name to its location is obtained, i.e. the name is resolved. The total of the names that an entity "knows" form the name space of that entity; similarly, the total of the entity locations of a system constitute the entity location space of that system.

The underlying basic concept of the invention thus consists in controlling an entity's access to a service by controlling the name resolution process, e.g. by limiting the visibility of services for this entity. A further feature of the invention consists in providing a variable-grained control of the name space and of the name resolution process, e.g. by executing this control by an "intelligent" interception manager. An independent main feature of the invention consists in providing attachable and detachable "guards" which are associated with a name and called before or after this name is used and provide for fine-grained resource protection.

By using one or more of the features above, a dynamically configurable protection domain is created, meaning a controlled and confined environment, i.e. a dynamically configurable "sandbox", in which entities can operate freely. Effects of any malicious behavior are restricted to the sandbox and thus cannot propagate to the rest of the system. One can also provide tightly controlled entry and exit points to and from such a sandbox, and, in particular, fine-tune its shape and size dynamically.

DESCRIPTION OF A PREFERRED EMBODIMENT

Figure 1:
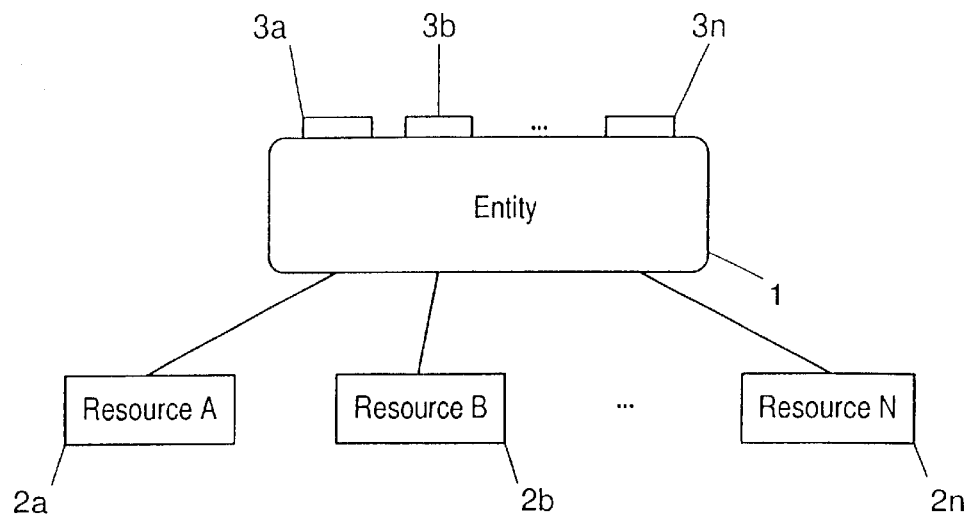
FIG. 1 shows an entity with its interfaces and resources (terms defined below)

In the following, a general overview (A) of the features of the invention will be first given, followed by description of an implementation of the invention (B), both in the environment of a Java-based network as an example for an object-based, distributed, networked system. Java is a programming language and environment developed by Sun Microsystems, Inc. 2550 Garcia Ave., Mountain View, Calif. 94043-1100, USA; the term "Java" is a trademark of this company.

A. Overview of Principles
The Java Environment

In the following, some typical terms relating to the Java computing environment and used in this description shall be listed and briefly explained.

An applet is Java bytecode which is typically is loaded from a remote source; it is usually not considered trustworthy.

An application is Java bytecode which is typically loaded from local; it is usually considered trustworthy.

The Internet is a worldwide, open computer network consisting of many different subnetworks.

The World Wide Web (WWW) is an open subnetwork of the Internet.

An intranet is a closed internal network, usually a subnetwork of the Internet, often used within companies.

A browser is a computer software or environment supporting the looking around (surfing) in the World Wide Web and for downloading and executing applets.

Java bytecode is code produced by a compiler for the JVM, see below.

The Java Virtual Machine (JVM) is a fictional, but well-specified processor which executes the Java bytecode. It is fictional because the machine is implemented in software.

A library is a collection of defined functions or classes for use in a program.

A sandbox is a playground to which Java applets are confined. It is an execution environment delineated by borders with defined entry and exit points (gates), see below.

The Sandbox Security Model

The so-called sandbox, described by J. S. Fritzinger and M. Mueller in: "Java Security", Sun Microsystems, Inc., 1996, supra, dedicates a "playground" delineated by defined borders and gates to Java applets. All applets are confined to this sandbox. In order to access something outside the sandbox, an applet must pass through a corresponding gate. Similarly, any communication with the applet has to go through the gates, which control and may restrict the crossing. Typically, applets are developed remotely. A user customarily initiates the downloading of an applet and it usually travels over untrusted public networks such as the Internet.

Whether an applet can be trusted or not depends essentially on the following factors:

Can an applet programmer be prevented from writing hostile programs, i.e. can the programmer be trusted?

Can the compiler which produces the bytecode according to rules defined by the language specification be trusted?

Can the network be trusted, where an intruder might damage or modify the integrity of the applets?

Any applet suffering from any of the above is not considered trustworthy. Stand-alone applications on the other hand are typically developed locally, i.e. in a secure environment, or travel over trusted networks such as an intranet. Therefore, applications are usually considered trustworthy. However, this coarse black and white distinction between applets and applications is not sufficient. Since the sandbox approach is applied to applets only and not to applications, the implemented security is limited to applets. In addition, numerous bugs have been discovered in the implementation of presently known sandboxes which renders its available implementations insufficient and incomplete.

Usually, the sandbox is implemented in the browser. It is hard-coded with no enduser interaction possibility and is not programmable. It is therefore a static model with fixed borders and fixed gates. Only the decision of a gate varies, not the gate itself, i.e. its location, its policy, or its existence. This model does not consider the origin of downloaded code; it only coarsely distinguishes between local and remote programs, i.e. applications and applets.

In short, the known implementation of the Java security model fails to separate the enforcement of an appropriate security policy and the mechanisms that implement the policy. The known security model is static, and its implementation of the sandbox paradigm is insufficient as most user-controlled decisions are hard-coded in the Java Virtual Machine. Obviously, the lack of configurable security features limits the acceptance and applicability of this known security model.

The new security mechanism for object-oriented systems according to the invention can be directly applied to the Java environment. Whereas some of the terms essential for this chapter have well-accepted definitions, others are used in a specific way in this description. For consistency, a short definition of those terms follows.

Terminology

Objects encapsulate data and provide methods; the data can be accessed only through these methods. Objects are created dynamically, that is, they are instantiated.

Classes are definitions for objects and are static.

Entities are considered as objects or referenced classes, regardless of whether they are active or passive; entities own or provide resources.

An interface consists of a set of methods of an entity through which the entity data and services can be accessed and transformed.

A name is a symbolic reference to a method of an entity; a name is NOT understood. i.e. interpretable, by the execution component of the runtime system.

An object reference is a pointer to a location of a method of an entity; an object reference is understood, i.e. interpretable, by the execution environment of the runtime system.

A service is considered a method of an entity, either referenced through an object reference or through a symbolic reference.

The Invention

The novel security mechanism is aimed at protecting resources against unauthorized access in an object-oriented system. It can be used for auditing and monitoring resource usage as well as for access control. The design of it is based on the basic assumption that no program can do any harm if resource access is strictly controlled. The following components, alone or in combination, appear essential to the security mechanism according to the invention:

Object-oriented paradigm: Data are encapsulated by entities and can be transformed by provided interfaces only. The approach to protect the entities data is to control access to their interfaces.

Lazy object binding: Each symbolic reference (or name) is substituted at runtime by the corresponding object reference, through which the service may be invoked. This substitution process is intercepted by the security mechanism according to the invention.

Name resolution: To obtain an object reference for a given name (a symbolic reference), a name resolution is necessary. This name resolution maps the name to an object reference. In the novel mechanism, this mapping may be intercepted by an interception manager which controls the name resolution.

Guard object: They can be attached arbitrarily to object references. These guards are invoked before and/or after the object reference is used. In addition, they may access context information.

The Object Oriented Paradigm

Resources are encapsulated by entities and can be accessed only through provided interfaces. Thus, in order to protect resources in an object-oriented system against unauthorized access, one can reduce the issue of controlled access to such resources to the problem of controlling access to the interfaces of the associated entity. An entity may provide different resources, and therefore, provide different interfaces, as shown in FIG. 1. To use a particular resource, the name (and the location) of this resource must be known; this name is then transformed into an object reference, which points to a location, where the corresponding method resides.

Lazy Object Binding

Binding is the process of linking necessary components of an executable code together. The components are produced by the compiler and are called object files. Object files contain symbolic references to other object files. By linking these object files together, a linker substitutes symbolic references with a corresponding object reference. At that point, the executable code possesses the necessary object reference, that is standable, i.e. interpretable, by the execution environment, and thus the executable code is able to invoke the referenced methods.

If the substitution is done at runtime, it is called dynamic binding otherwise, i.e. if the substitution is done before the code is executed, it is static binding. If the substitution of all symbolic references happens at one point in time, the link process is called eager binding. In case it is done only once an object reference for a symbolic name is needed at runtime, it is called lazy binding. Once the substitution is done in the executable code, it is fixed and is not subject to change anymore.

A C++ compiler, for instance, merges the human readable, symbolically referenced methods of other entities (i.e. names) with their type information into further symbolic references. Any of these references is still symbolic (i.e. a name), but not in human readable format anymore. The binder then includes the appropriate code, according to the symbolic references, and substitutes the symbolic references with an appropriate object reference. This object reference then points to the beginning of the location where the method resides. The Java environment uses a lazy binding approach. Each symbolic reference is substituted once the execution environment uses it.

The distributed approach allows the invocation of methods across address spaces and/or systems. In most cases, remote objects are represented by proxy objects which act as their local representatives. Usually, proxy objects locate, create, destroy and invoke the remote object. Thus, the object reference points to the location of the corresponding proxy object.

Interception and Name Resolution

Figure 2A:
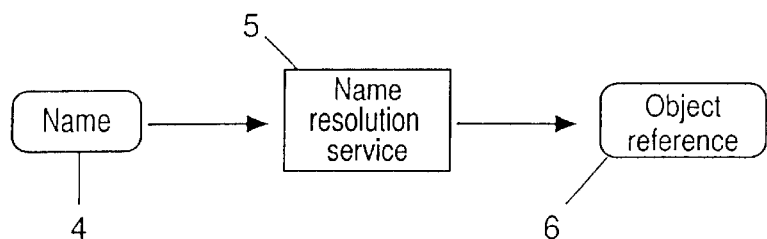
FIGS. 2a, 2b depict ways of mapping a name and its object object reference.
Figure 2B:
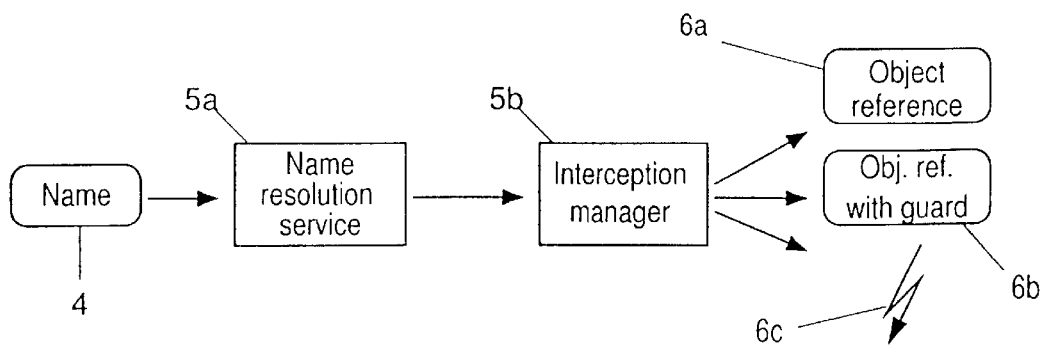
Figure 3A:
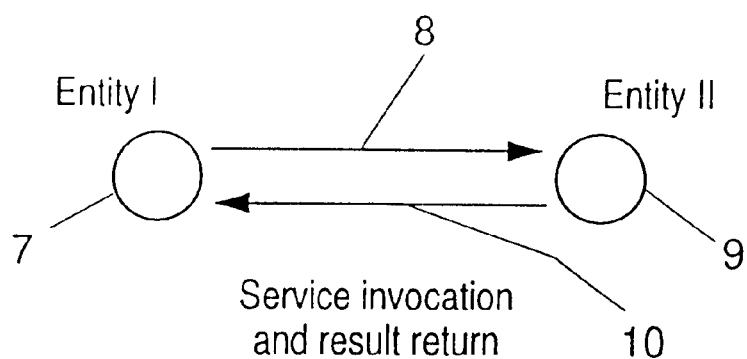
FIGS. 3a–3c exhibit steps and variations of the method according to the invention.
Figure 3B:
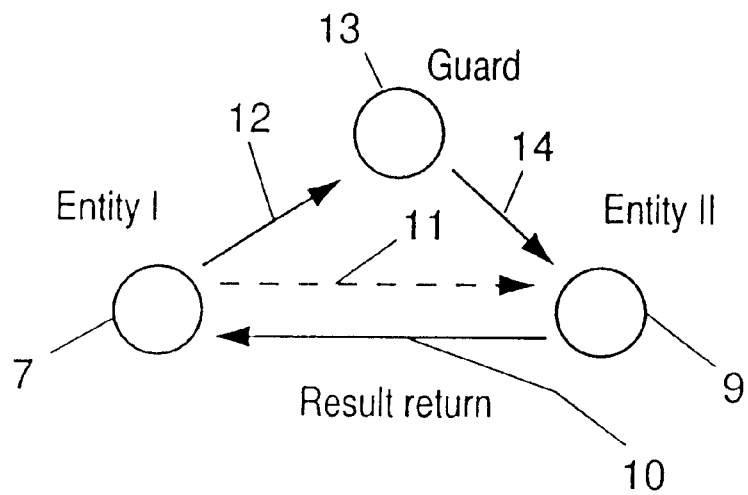
Figure 3C:
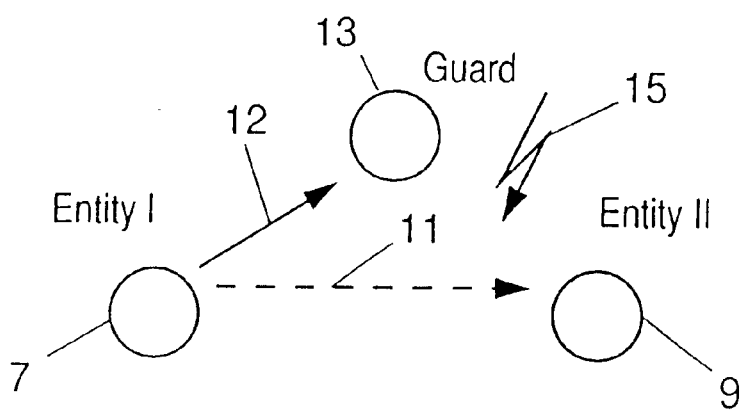

A particular feature of the novel mechanism intercepts the binding process, whether it is an eager binding or a lazy binding scheme, and interposes an interception manager. The resolution of the symbolic reference, i.e. the name, requires a mapping between the latter and the corresponding object reference. The process of finding the corresponding object reference to a given symbolic reference (name) is the name resolution. This is executed by a name resolution process as shown in FIGS. 2a and 2b. To use a particular method, the calling entity has to know the symbolic reference or name which must be properly resolved to an object reference. The separation of references the entity might know of, which are represented by their symbolic references, and the references the entity certainly knows of, which are represented by their object references, leads to two different name spaces:

The presumed name space of an entity consists of a set of symbolic references. These symbolic names are not yet resolved, but are candidates for the resolving process. Entities presume that these references exist, but these presumptions have not yet been verified through the resolving process. These methods can not yet be invoked; they are not understandable by the runtime execution component.

The concrete name space of an entity consists of a set of object references. These object references are resolved names, which are definitely known by the entity because they have been verified by the resolving process. Object references are understandable by the runtime execution environment.

The set of methods referenced in the concrete name space is usually a subset of the methods referenced in the presumed name space. The references are different (object reference vs. symbolic reference), but the referenced method is the same.

Interception Manager

The so-called interception manager shown in FIG. 2b is an optional feature of the invention. The main responsibility of the interception manager, if provided, is to control and modify the name resolution process according to a particular security policy. For example, it can tighten the concrete name space by preventing the resolution of some symbolic name. To intercept the name resolution process and interpose the interception manager leads to an access control mechanism. This regulation of the concrete name space for security purposes is based on the assumption that no resource can be used without having the object reference of its representing entity. A symbolically referenced method is resolved, if and only if the interception manager allows this resolution.

As shown in FIG. 2b, the interception manager is part of the name resolution process. The result of the name resolution process, an object reference, is intercepted; the interception manager either returns the unmodified object reference or an object reference attached with guard objects or an exception that the referenced entity does not exist. The granularity of access control performed by the interception manager depends on the granularity of the resolution process. More precisely, the interception manager may act on a coarser level but not on a finer level. Nevertheless, variable-grained access control is still existing. The interception manager has access to context sensitive information, such as the source entity name, the destination entity name, and their data. To control access alone may not be sufficient in some cases and it may be necessary to monitor or to audit resource usage. This demands a further component of the security mechanism to be invoked before and/or after the protected resource is used. Such an object is called a guard which can be inserted by the interception manager.

Guard Objects

Guard objects, another optional feature of the invention, are associated with a particular object reference and will be called before and/or after that object reference is used, depending on how the interception manager installed the guard objects.

A guard object is said to be installed before the destination entity, if the guard object is invoked before the associated object reference is used, and thus has access to the supplied arguments for the destination entity. A guard object is said to be installed after the destination entity, if the guard object is invoked after the associated object reference is used, that is, the called method returns, and thus has access to its return value. FIG. 2b shows the modified object reference with attached guard objects as one of the return results of the intercepted name resolution process.

If the guard object indicates no error, execution continues as usual. Similar to the context information used by the interception manager, guard objects also have access to context sensitive information. This includes the source entity name, the destination entity name, and invocation parameter(s). If guard objects are installed before the destination entity, they may perform the following actions:

reject the invocation pass the invocation unchanged transform the invocation supplied data change the destination of the invocation assign and/or check rights to the caller entity monitor the access perform a notification and/or auditing service.

If guard objects are installed after the destination entity, they may perform the following actions:

change return parameters or state remove previously assigned rights monitor the reply perform a notification and/or auditing service.

Guard objects cannot be influenced by the source or destination, i.e. calling and called, entity, because they have been attached from outside by the interception manager.

Guard objects are invisible, transparent, as far as the invoking and the invoked, i.e. calling and called, entities are concerned. Contrary to the interception manager, guard objects are unable to tighten the concrete name space directly, they may influence it indirectly, though: They are able to unresolve the object reference to which they are attached to the original symbolic reference. As a consequence of this unresolving, the next usage of this method shall again encounter a symbolic reference, and shall lead to a call to name resolution and, therefore, to the interception manager. The interception manager then has again the possibility of modifying the concrete name space of the calling entity according to its security policy. Object reference unresolving might be useful if the security policy changes after the symbolic reference has been resolved.

In addition, each guard object has the possibility to decide how long it wants to be attached to its object reference. A guard object may decide to detach itself, and therefore will not be called any longer for the invocation of the object reference.

Capabilities

A so-called capability is the right to invoke a particular object in a particular mode (explained further down in the description). As described by A. S. Tanenbaum in "Modern Operating System", Prentice Hall International, Inc., 1995, the right may include three components:

(1) A pointer to the object: The required pointer is accomplished by the resolved reference—the object reference. It is assumed, that a proper runtime system makes the invocation possible, if an executable code has the pointer. That means that every entity that possesses a capability is able to invoke the corresponding method.

(2) The type information of the object: The required type information is accomplished through attached guard object(s). The type of the capability depends on the associated guard object(s).

(3) An access right for the object: The required access right is accomplished by attached guard object(s). They may check the rights, the calling entity must provide to use a particular method. In addition, if the calling entity has the appropriate rights, the guard object may enhance existing rights, or may assign new rights, to use this service.

Guard objects together with the object reference are similar to a capability, but are not the same. A resolved name with an installed guard object may be considered as an enhanced dynamic capability. The dynamic component of a capability is the associated guard object.

Overview Summary

The presented approach for protecting resources in an object-oriented system thus includes one or more of the following features: The object-oriented paradigm lends itself well to control access to resources through objects and their interfaces. Access control is achieved through control of the name space for the calling entity, thus controlling the visibility of resolved names. If the calling entity is unable to see a service, it cannot invoke it; without invocation possibility of a method, the associated resource cannot be used. Since the resolution manager (and the optional guard objects) may use context information, they may act very flexible and context dependent. Guard objects can be attached from outside, without the knowledge of either entity; they are invisible, transparent as far as the calling and the called entity are concerned. Thus, the mechanism protects with little costs in terms of performance overhead and in a dynamic fashion.

B. Implementation

In the following, an implementation of the security mechanism according to the invention is described in the Java environment. All changes made to the Java Virtual Machine (JVM) which includes the interpreter and the runtime library will be reviewed. In addition, the components of the invented security mechanism which are implemented in Java shall also be presented.

Since this chapter also deals with details of the implementation, the person skilled in the art is assumed to be familiar with the basic mechanisms of the JVM and its implementation in the C language as well as the Java programming language itself. A comprehensive presentation of the Java language and its implementation of the JVM was disclosed by J. Goslin, B. Joy, and G. Tele in "The Java Language Specification" and T. Lindholm and F. Yellin in "The Java Virtual machine Specification", both by Addison-Wesley Publishing Co., 1996. The implemented components of the invented security mechanism are based on the Java Development Kit (JDK) Version 1.0.2 and the AIX Version of the JVM. This chapter describes the components of protecting system resources represented by system classes. The changes to the Java Virtual Machine were kept as small as possible, a few changes were unavoidable, though.

B1. Functionality Overview

The implemented functionality of the invented security mechanism comprises an implementation of an interception manager and some rudimentary guard objects. The term entity is refined from the previous chapter to apply to particular classes. A class is an entity in the sense that it owns and represents resources. Since system resources are represented through their corresponding system classes in the Java library, the classes are well-known with an unambiguous, fully qualified name. Thus, this implementation provides protection of system classes that reside in the Java library. An object reference received from the name resolution process (see below) is a pointer to the corresponding piece of code, which actually points to the beginning of a method description. Thus, the object reference includes the knowledge of the location, and the method can be invoked immediately.

Protection of system classes is achieved through controlling access to them by modifying the name space accordingly. If the object's concrete name space contains an object reference, subsequent access to the referenced method is granted. Hence, as stated in the assumption above, the program can only access those resources for which the object reference is available. To control and modify the concrete name space of an object, the lazy binding mechanism and the name resolution are exploited by interposing an interception manager as discussed. Guard objects are associated with object references. To call guard objects before the original method is executed, the method invocation scheme is enlarged with a check for installed guard objects.

To implement this functionality, the following issues are crucial:

Resource protection through control of the name space

Changes in the method invocation component in the Java Virtual Machine

Interception information base class providing access to the native C code

Implementation of the interception manager

Guard object base class

B2. Java Virtual Machine Changes—System Level

This section discusses the enhancements of the Java Virtual Machine and the Java runtime library. The enhancements are implemented in native C code and are thus machine dependent. The following components were changed to implement the security mechanism according to the invention:

Name resolving component of the virtual machine

All opcodes dealing with method invocation

Binary method representation in memory

Thread structure

Name Space Modification

In order to achieve access control, and thus resource protection, the concrete name space of the calling object is controlled; it is either tightened or enlarged.

To modify the name space of the originating object, Java's lazy object binding method is exploited. Java's binary file layout references others classes and interfaces and their fields, methods, and constructors symbolically, using fully qualified names. For fields and methods, these symbolic references include the name of the class or interface type that declares the field or method, as well as the name of the field or method itself, together with appropriate type information. Before an object can be used, its name must be resolved to an object reference: The identifier is checked to be correct and, typically, replaced with a direct object reference that can be more efficiently processed if the reference is used repeatedly. If an error occurs, an exception will be thrown, see J. Goslin, B. Joy, and G. Tele in "The Java Language Specification" and T. Lindholm and F. Yellin in "The Java Virtual machine Specification", both by Addison-Wesley Publishing Co., 1996.

Figure 4:
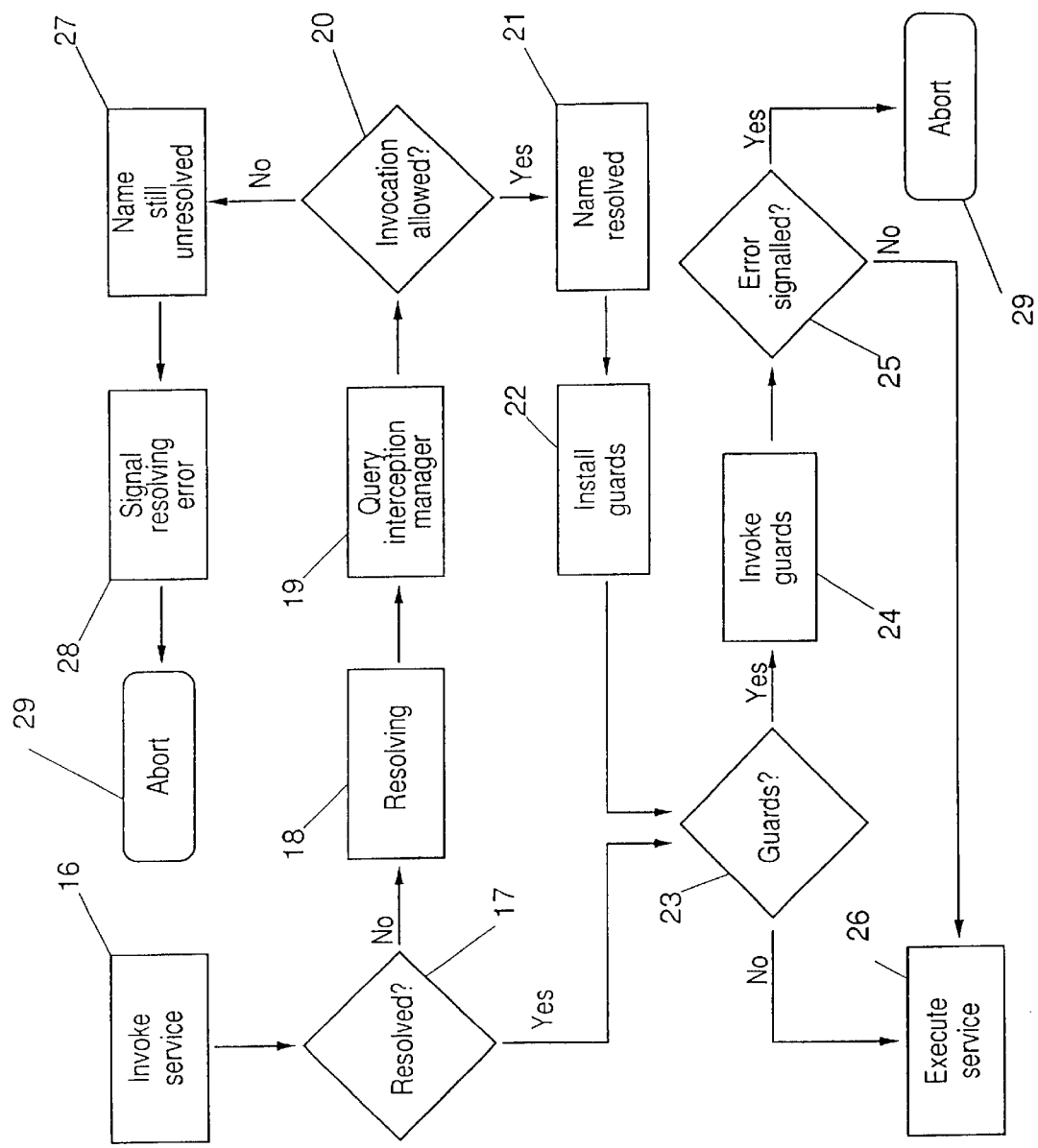
FIG. 4 is a block diagram of an implementation of the invention.

After the name is resolved to an object reference, the interception manager is called which decides whether resolution of the symbolic reference should be permitted (see FIG. 4). Thus, the name resolution is intercepted, and therefore the lazy object binding. According to the return value of the interception manager, the concrete name space modification is performed:

If the interception manager returns false, a NoClassDefFoundError exception is thrown, indicating to the invoking object that the class file is not existent. Therefore, the name of the desired resource cannot be resolved and, as a consequence, the location of the corresponding piece of code is unknown. This scheme of asking the interception manager and subsequently throwing an exception tightens the concrete name space of the calling object.

If the interception manager returns true, the invocation continues as usual and the concrete name space is not modified. In fact, the concrete name space is enlarged with the resolved name, that is, with a pointer to the corresponding piece of code, with the object reference.

Code fragment C1 below depicts the new code that was inserted in the name resolution function. This C code fragment performs the following steps:

(1) Initializes the structures needed for managing guard objects.

(2) Checks whether the requested resolution is allowed; if not, mark the method as unresolved and return false.

(3) Otherwise mark the method as resolved and replace the symbolic information with a pointer to the corresponding piece of code.

Since the interception manager may attach several guard objects, the method invocation scheme required modification, in addition to the name resolution process.

Code Fragment C1

This code fragment has been inserted in the function which resolves symbolically referenced names. The appropriate exception is thrown in the $ic_{13}$ CheckMethodResolving( ) method. (In this code, guard objects are called "filter objects".)

```
[resolving method]
/*
 * If the corresponding method representation
 * could be found, prepare the filter dispatch
 * table for this method
 */
ic_PrepareFilter(class, mb);
/*
 * Now check whether this particular name
 * resolving is allowed or not
 */
if (!ic_CheckMethodResolving(mb)) {
/*
 * Ooops, no permission to resolve this method
 * mark it unresolved, therefore
 */
    fieldfiltertable (&mb->fb)->resolved = FALSE;
    return FALSE;
}
/*
 * Mark the method as resolved
 */
fieldfiltertable(&mb->fb)->resolved = TRUE;
/* change the symbolic name information to
 * a pointer to the appropriate methodblock
 */
constant-pool[index].p = mb;
continue_as_usual ( );
[ . . . ]
```

Method Invocation

The Java interpreter is responsible for executing methods that have been resolved already. A detailed discussion about the method invocation related procedures was described by T. Lindholm and F. Yellin in "The Java Virtual Machine Specification", Addison Wesley Publishing Co., 1996. FIG. 4 outlines the control flow of a method invocation. The ten new components added by the invention are 19–25 and 27–29, the other components are original Java components. The new components according to the invention include checks concerning name resolving and execution of guard objects.

Opcodes

An opcode is a short term, usually a number, representing a particular set of operations. It represents a particular functionality. For example, the opcode 182 (0xb6), associated with the mnemonic opc_invokevirtual, represents the basic steps to invoke a virtual method. A detailed description of the various Java opcodes and the functionality they provide can be found in T. Lindholm et al, supra. To install and maintain guard objects, the implementation of opcodes dealing with method invocation is changed. The functionality is extended with a check for guard objects and with code to execute them subsequently. After the last guard object is executed, the original method is executed.

C2 is a C code fragment that has been inserted in every opcode dealing with method invocation. This code fragment performs the following steps:

(1) Check whether there have been guard objects installed or not; if no guard objects have been installed continue as usual.

(2) Check whether the method is resolved or not; if it is resolved, subsequently call the installed guard objects.

(3) Check whether an exception has to be handled or not; if an exception has been thrown, abort the execution of methods and handle it.

To attach guard objects to object references, the memory layout of the original method is extended.

Code Fragment C2

This code fragment is inserted before execution of the original method.

```
[execute method]
/*
 * filter dispatch table installed?
 * if yes, check whether there are
 * any filter objects installed or not?
 */
if (fieldfiltertable(&mb->fb) &&
    (fieldfiltertable(&mb->fb)->used_filter)) {
/*
 * method resolved through the invention mechanism?
 */
    if (fieldfiltertable(&mb->fb)->resolved == TRUE) {
        /*
         * invoke the installed filter objects
         */
        ic_InvokeFilterObjects(fieldfiltertable(&mb->fb), ee);
    } else {
        /*
         * check the name space, therefore invoke the
         * InterceptionManager object
         */
        ic_CheckMethodResolving(mb);
    }
/*
 * everything ok? nobody threw an exception
 */
    if (exceptionOccurred(ee))
        goto handle_exception;
}
continue_executing_original_method( );
[ . . . ]
```

Method Representation

To execute an arbitrary method of an object, the method needs a corresponding binary representation in memory. The binary representation of a method is split into static components and dynamic components. The static components include its class description and static fields, the dynamic components include its dynamic fields. The distinction between the text and data segments in the representation of the binary executable in the UNIX operating system is a similar concept; both segments are mapped into different areas of the address space—the text segment is mapped in read-only mode and the data segment is mapped in read/write mode.

The static components of a method are shared by all objects instantiated from the same class description, but each object has its own dynamic components. Guard objects are attached to a static component of a method, the field-block structure. Thus, a guard object is also shared by all instances of the same class description. Although guard objects are attached to the static component, the implementation is prepared to attach guard objects to distinct objects and their methods rather than to classes and their methods.

Guard Dispatch Table

The guard dispatch table manages attached guard objects. It holds the references of each guard object and indicates how many guard objects are installed. The header consists of the following administrative elements. (For historical reasons, guard objects are called "filter objects" in the code):

- a variable indicating how many guard objects are used (denoted by used_filter)
- a variable indicating the number of guard objects for which space is allocated (denoted by res_filter), where res_filter>used_filter must be true at all times
- a flag indicating whether the method is considered resolved or not (denoted by resolved)
- a pointer referring to the attached method representation (denoted by mb)
- a pointer to the class file of the calling object (denoted by caller)
- a pointer to the first element of a dynamic array comprising the managed guard object structures.

The following code fragment C3 shows the structure of the guard dispatch table header.

Code Fragment C3

This is the header of a guard dispatch table.

```
struct filterdtable {
    int used_filter;
    int res_filter;
    int resolved;
    struct methodblock *mb;
    struct ClassClass *caller;
    struct filterdesc *filters[1];
};
```

The type of element of the array, which is denoted by filters, is shown in code fragment C4; it comprises the following components:

- a pointer to the object memory location of the guard object (denoted by obj),
- the name of the method which should be called (denoted by methodname),
- the corresponding signature, since it is possible to implement that two methods have the same name but different signatures (denoted by signature),
- and a call-back methodname (denoted by notify) which specifies a method at the interception manager class that is called when the guard objects detach themselves from the corresponding object.

Code Fragment C4

Each entry in a filter dispatch table is of the type filterdesc.

```
struct filterdesc {
    HObject *obj;
    char *signature;
    char *methodname;
    char *notify;
};
```

Since the guard objects are implemented in Java, they are in turn potential candidates for name space modifications and for attaching guard objects. To avoid a recursion problem, the executing thread is marked accordingly.

Threads

A thread is an execution path in an address space. This address space can be shared by many concurrently executing threads. A detailed discussion about the thread concept was given by A. D. Birell in "An Introduction to Programming with Threads", System Research Center (SRC) Report, Digital Equipment Corp., Jan. 6, 1989.

Guard objects and the interception manager according to the invention are implemented in Java. Since they also access resources, a criteria is needed to distinguish between components that belong to the mechanism according to the invention and components that do not. Otherwise, every time the interception manager accesses a resource, and therefore invokes a method, it is checked by the interception manager itself. This recursion is broken by appropriately marking a thread. If the thread enters a guard object or the interception manager, it is marked as a thread being in a supervisor state. The next time it tries to enter a guard object or the interception manager, it is checked whether the thread is marked as being in a supervisor state. Depending on the presence of this mark, the runtime system decides whether to subject the thread to the novel mechanism. If the thread leaves the guard objects or the interception manager, the marker is erased.

This temporarily assigned status is somewhat similar to the traditional UNIX system call concept where the process executing a system call has more rights for accessing resources than a process not executing a system call. While in the kernel mode, a supervisor status is assigned temporarily to the executing process. With these privileges, the process has access to protected resources maintained by the operating system. When leaving the system call, the privilege status is erased. A detailed description of the system call concept was given by S. J. Leffler et al in "4.4 BSD UNIX Operating System", Addison Wesley Publishing Co., 1996.

Guard objects and the interception manager also can access context data and may modify them, including arguments supplied to the original method. If the original method invocation is intercepted and the interception manager is asked, or the guard objects are called, the executing thread is temporarily assigned a pointer to the stack frame of the original method. Hence, they have access to the method arguments sitting on the stack.

When entering the security components according to the invention, a pointer to the appropriate guard dispatch table is assigned to the executing thread. Thus, the thread has complete access to all guard objects.

To achieve the functionality described above, the thread structure is enlarged with the following components, which are all assigned to when the thread crosses the boundary between normal code and security code:

- a single bit indicating whether the thread is in supervisor state or not (denoted by sv_thread)
- a pointer to the appropriate guard dispatch table (denoted by iv_filtertable)
- a pointer to the appropriate stack frame of the original method (denoted by ic_optop)

B3. Java Class Hierarchy—User Level

In this section, the components implemented in Java are discussed. The implementation of the novel security mechanism in Java follows one of the main principle of the Java philosophy: be as portable as possible.

Therefore, most of the implementation is done in Java using a well-defined interface to the components implemented in native C code. The routines implemented in native C code can be accessed through an abstract base class called InterceptionInfo.

Interception Information

InterceptionInfo is an abstract class in Java. It is used to provide the basic security functionality according to the invention. A discussion of the class modifiers in Java was given by J. Goslin et al, supra. The components of this base class can roughly be divided into the following categories:

- managing the installation of arbitrary guard objects
- managing the removal of arbitrary guard objects
- managing the order of installed guard objects
- retrieval and modification of arbitrary arguments
- retrieval of the fully qualified name of the calling object/ entity and called object/entity, of the method name, and of the signature name.

An overview of the Application Programming Interface (API) provided by the InterceptionInfo base class is given in the code fragment C5. In order to obtain full security functionality according to the invention, the interception manager class and all guard objects must subclass this InterceptionInfo base class as shown.

Code Fragment C5

This class provides the interface for the implemented native C code.

```
public abstract class InterceptionInfo {
    protected native void unresolveMethod( );
    protected native int getIntArgument(int index)
        throws ArgumentAccessException;
    protected native void setIntArgument(int index, int value)
        throws ArgumentAccessException;
    protected native float getFloatArgument(int index)
        throws ArgumentAccessException;
    protected native void setFloatArgument(int index, float
        throws ArgumentAccessException;              value)
    protected native byte getByteArgument(int index)
        throws ArgumentAccessException;
    protected native void setByteArgument(int index, byte
        throws ArgumentAccessException;              value)
    protected native Object getObjectArgument(int index)
        throws ArgumentAccessException;
    protected native void setObjectArgument(int index, Object
        throws ArgumentAccessException;              value)
    protected native void printArgument(int index);
    protected native Object getClassLoader( );
    protected static native String getCaller( );
    protected static native String getCallee( );
    protected static native String getMethodName( );
    protected static native String getSignature( );
    protected static native boolean
        pushFilter(InterceptionFilter arg, String filtermethod,
            String filtersignature,
            String ic_manager_notify);
    protected static native boolean popFilter( );
    protected static native Object[ ] getFilterList( );
} // Class InterceptionInfo
```

Interception Manager Class

The interception manager is implemented in Java and is declared final and static. The interception manager subclasses the InterceptionInfo base class. It is responsible for controlling and modifying the name space of the calling entity. The interception manager implements the security policy for the Java environment, regardless of whether the calling entity is part of an application or part of an applet, i.e. there is no distinction between application and applet. The interception manager defines the boundaries of a security sandbox and establishes gates for communication with the outside of the sandbox.

Since Java has its own memory management, the garbage collection is responsible for removing obsolete objects and freeing up the memory. An object is to be considered obsolete if no reference exists on the Java level anymore. Thus, the interception manager has to keep track of every guard object it created and installed subsequently, otherwise the garbage collection will remove this object while compactifying the memory. A detailed discussion about of garbage collection was given by T. Lindholm et al,.supra.

The interception manager creates guard objects and decides which one to attach to which method. It also specifies the order in which they will be called before and/or after the original method.

Interception Filter

The InterceptionFilter class provides the basic functionality required by the guard objects. It subclasses the InterceptionInfo class in order to access the same native C code methods as the interception manager. This class extends the subclassed one with a method to detach itself from the original method (the object reference where it is attached to). In the actual implementation, guard objects are executed before the original method is called. Code fragment C6 shows a rudimentary guard object base class. The defaultCallFilter( ) method is the method which is called by default before the object reference is invoked.

Code Fragment C6

```
public class InterceptionFilter extends InterceptionInfo {
    protected int unresolve;
    private protected InterceptionFilter( ) {
        unresolve = 0;
    }
    private protected void defaultCallFilter( ) {
        throw new ICFilterException("no filter method
        implemented");
    }
    private protected native void detachMySelf( );
}
```

Conclusion

This chapter B presented the key issues of an implementation of the ideas expressed in chapter A. The essential functionality of an implementation of the invented security mechanism was described as a subset of the proposed architecture, addressing the principle to control access to system classes representing system resources and to call in arbitrary guard objects.

The modifications done in the Java Virtual Machine were kept at a minimum. The crucial changes were made in the name resolution process, to modify the concrete name space of the calling object, and in the method invocation process to call guard objects. Security can now be assured for every single method invocation through guard objects or, alternatively and selectively, just once during the name resolving process. Both the interception manager and the guard objects enable a programmer to form a variable grained protection mechanism, which can be optimized in respect of the desired degree of protection as well as from an economical viewpoint.

What is claimed is:

1. A method for protecting resources against unauthorized access in a data processing system, said resources owned by a called entity and a resource capable of being requested by a calling entity using a symbolic name representing said resource, wherein a totality of symbolic names define a presumed name space for an entity, said distributed data processing system implementing a name resolution process for allocating an object reference to a symbolic name representing said requested resource, said method comprising steps of:

provide said name resolution process with a subset of all resources of the system to define a totality of object references reflecting permitted accessible resources capable of being verified by said name resolution process and forming a concrete name space for a called entity; and, permitting said calling entity access only to said concrete name space in said called entity.

2. The method according to claim 1, wherein the symbolic name includes at least an entity name and a method name.

3. The method according to claim 1, wherein said step of permitting said calling entity access filter comprises: resolving the symbolic name into an object reference (6) that allows access, in particular immediate access, of the calling entity (7) by invoking a desired method in the called entity (9), thus accessing the desired resource (2a ... 2n).

4. The method according to claim 1, further comprising the steps of:

intercepting a resolved object reference; and attaching a guard object (13) associated with said resolved object reference by substituting a reference to said guard object for the object reference (6), said guard object having functionality for implementing a security policy directed to usage of a resource.

5. The method according to claim 4, wherein the guard object provides conditional access to the desired method by hiding the object reference (6b) from the calling entity (7), and controlling the invocation process.

6. The method according to claim 4, wherein the guard object is called either before and/or after an object reference is used.

7. The method according to claim 5, wherein the conditional access provided by the guard object is effected at a finer level of breakdown, than a level of breakdown used in the name resolution process.

8. The method according to claim 1, wherein at least one of the method steps is implemented in an object-oriented manner.

9. The method according to claim 1, wherein said data processing system is a distributed, networked system.

10. The method according to claim 1, wherein said resource comprising one or more of: a file or an object that encapsulates data and methods for execution in said system.

11. An access control system for protecting resources against unauthorized access in a distributed data processing system, said resources owned by a called entity and capable of being requested by a calling entity using a symbolic name representing said resource owned by said called entity, wherein a totality of symbolic names form a presumed name space for an entity, said access control system comprising:

name resolution means for resolving a symbolic name by allocating an object reference to a symbolic name representing said requested resource;

means for allocating a subset of all resources of the system to define a totality of object references reflecting permitted accessible resources capable of being verified by said name resolution means and forming a concrete name space for an entity; and, means for permitting said calling entity access only to said concrete name space in said called entity.

12. The access control system according to claim 11, further including means (5b) for establishing a guard object (13) and for substituting a reference to said guard object for the object reference (6).

13. The access control system according to claim 11, wherein at least one of the means is implemented in software in an object-oriented manner.

* * * * *

UNITED STATES PATENT AND TRADEMARK OFFICE
CERTIFICATE OF CORRECTION

PATENT NO. : 6,658,573 B1
DATED : December 2, 2003
INVENTOR(S) : Joerg Bischof et al.

It is certified that error appears in the above-identified patent and that said Letters Patent is hereby corrected as shown below:

<u>Title page,</u>
Item [75], Inventors, "Urdorf" should read -- Zurich --

<u>Column 6,</u>
Line 5, after "binding" insert -- ; --

<u>Column 12,</u>
Line 33, "=" should read -- = = --

<u>Column 16,</u>
Line 27, insert the following -- This extend the InterceptionInfo abstract base class.--

<u>Column 17,</u>
Line 15, "filter" should read -- further --

<u>Column 18,</u>
Line 1, after "breakdown" delete -- , --

Signed and Sealed this

Twenty-second Day of June, 2004

JON W. DUDAS
*Acting Director of the United States Patent and Trademark Office*